April 18, 1961  C. P. SALMON  2,980,335
PRESSURE-INSENSITIVE AUTOMOTIVE THERMOSTAT VALVE
Filed Aug. 9, 1956
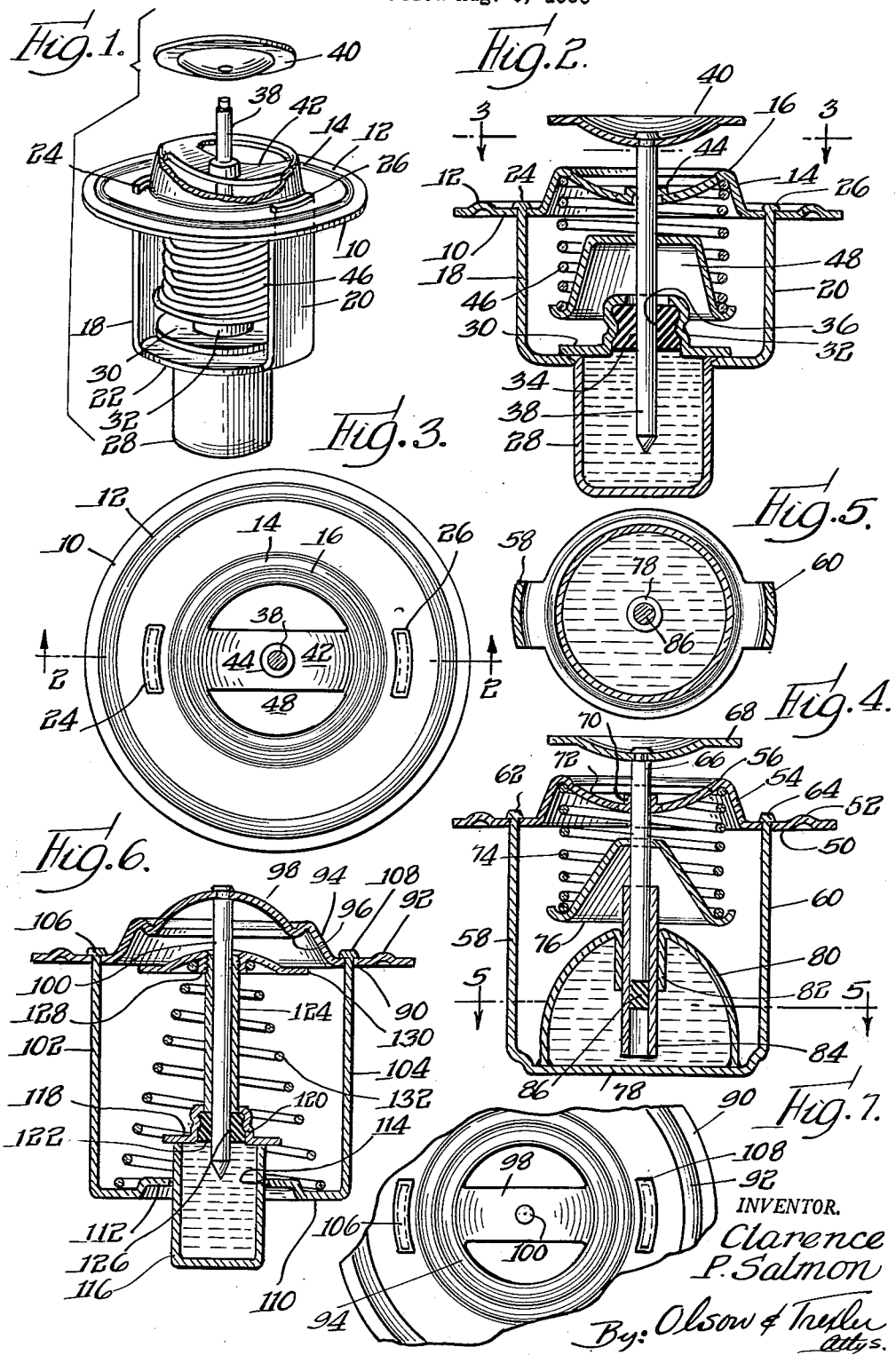
INVENTOR.
Clarence P. Salmon
By: Olson & Trexler
Attys.

United States Patent Office 2,980,335
Patented Apr. 18, 1961

2,980,335

PRESSURE-INSENSITIVE AUTOMOTIVE THERMOSTAT VALVE

Clarence P. Salmon, Elgin, Ill., assignor to Flexonics Corporation, Maywood, Ill., a corporation of Illinois Filed Aug. 9, 1956, Ser. No. 602,988

1 Claim. (Cl. 236—34)

This invention relates to thermostat valve assemblies suitable for use in the radiator systems of internal combustion engines.

Specifically, the valve assembly of the present invention includes a simple poppet valve actuated directly by a single rod reciprocable by the expansion of a suitable thermally responsive medium confined in a rigid container forming part of the valve assembly. As a result, this thermostat valve is not affected, in its operation, by variations in ambient pressure, specifically, variations in static or dynamic pressure of the water or other medium in which the thermostat valve is immersed, and to the temperature of which the thermostat valve is responsive. Further, rubber or other resilient means are disposed in contact with the valve actuating rod in such fashion as to absorb or reduce shocks likely to be encountered, say, in operating an automobile and also to provide for possible distortion of parts of the valve when the valve is repeatedly seated in and removed from a radiator system. Supporting and connecting members of generally skeleton form are also included in the valve assembly. Thus, the valve assembly of this invention includes a minimum of fixed and movable parts, which contributes greatly to dependable operation and inexpensive manufacture.

Other and further features of the present invention will become apparent from the following description and the appended claims as illustrated by the accompanying drawings which show, by way of example, several valve assemblies according to the present invention, and in which:

Fig. 1 is a partly exploded, perspective view, with parts broken away, of a first thermostat valve assembly according to the present invention;

Fig. 2 is an enlarged central vertical cross sectional view taken along the line 2—2 of Fig. 3;

Fig. 3 is an enlarged transverse cross sectional view taken along the line 3—3 of Fig. 2;

Fig. 4 is a view similar to Fig. 2 but illustrates a second thermostat valve assembly according to the present invention;

Fig. 5 is a cross sectional view taken along the line 5—5 of Fig. 4;

Fig. 6 is a view similar to Fig. 2 but illustrates a third thermostat valve assembly according to the present invention; and Fig. 7 is an enlarged fragmentary plan view of the valve assembly of Fig. 6.

The thermostat valve assembly shown in Figs. 1-3 comprises a round centrally apertured metal sheet disk 10 having a peripheral portion suitably formed, as with an upwardly extending annular bead 12, for attachment to a radiator conduit in an internal combustion engine. Around its central aperture, the inner rim of the disk 10 is formed into a generally vertical flange 14 having its upper edge deflected toward the center of the aperture to define an annular valve seat 16.

The disk 10 has depending therefrom a U-shaped thermostat strap comprising a pair of legs 18 and 20 connected at their lower ends by a platform portion 22. Specifically, the upper ends of the legs 18 and 20 are staked to the disk 10 at diametrically opposed areas thereof between the bead 12 and the vertical flange 14, as indicated, respectively, at 24 and 26.

The platform portion 22 of the thermostat strap is apertured (concentrically with the valve seat 16) to receive therethrough a rigid container 28 forming a part of a thermostat and closed at its upper end by a rigid cover 30 fixedly attached thereto. The upper rim of the container 28 fits inside the platform aperture, and the peripheral portion of the cover 30 extends outside the container 28 and over the upper surface of the platform 22. The container 28 and/or its cover 30 are attached to the platform 22 by any suitable means, such as welding or soldering.

The thermostat cover 30 is centrally apertured and, around this aperture, the cover is formed into an upstanding flange 32 of generally inverted cup-shaped cross sectional configuration, the end of the flange being deflected centrally. A sealing plug 34 (which may be made of rubber or like resilient or plastic material) is received within the cup-shaped flange 32, the latter being crimped around its middle to hold the plug. Further, the plug 34 is formed with a central vertical bore 36 sealingly and slidably receiving a rod 38 having a lower pointed end extending into the container 28. At its upper end, the rod 38 carries a dished valve 40 adapted to cooperate with the valve seat 16.

For guiding the rod 38 in its vertical reciprocation, the central aperture of the disk 10 is spanned by a cross web 42 having its center apertured and formed with an upturned flange 44 defining a guide sleeve for the rod 38.

For biasing the valve to closed position, a helical spring 46 has its upper end seated in an annular groove defined at the lower surface of the internal rim of the disk 10, the innermost edge of the flange forming the valve seat 16 being bent downwardly for this purpose. The lower end of the spring 46 is seated in an outwardly and upwardly bent flange forming the rim of a member 48 of inverted cup-like shape carried by the rod 38, the bottom of this member being centrally apertured to receive the rod 38 therethrough in fixed relationship.

In the operation of the thermostat valve assembly of Figs. 1-3, the thermally expanding medium in the rigid container 28 (such as dichlorobenzene, a polyethylene glycol, or a liquid or waxy hydrocarbon) is exposed to heat transfer from the ambient medium through the container walls, which are constructed of material of good heat conductivity, for instance, copper or aluminum. When the temperature of the ambient medium rises, the medium in the container 28 will expand, thereby forcing the rod 38 upwardly with a force hydraulically multiplied according to the ratio of the cross sectional areas of the rod 38 and the container 28. On upward movement of the rod 38, the valve 40 will be lifted from the valve seat 16 against the force of the spring 46. On further rise of the temperature of the ambient medium, the valve 40 will be raised still higher, to permit the flow of a greater volume of water through the valve. When the temperature of the ambient medium drops, the thermally responsive medium in the container 28 will contract, and the spring 46 will force the rod 38 and the valve 40 downwardly, until finally the valve 40 will rest on the valve seat 16. At this time, the valve is closed. It will be noted that the static or dynamic pressure of the ambient medium (ordinarily, water) has no influence on the operation of this thermostatic valve assembly.

The resilient plug 34 not only seals the thermostat chamber 28, 30 against leakage of thermally expanding medium along the rod 38 but also permits a limited tilting of the rod 38 in the event the disk 10 or cross web 42 are distorted, as may happen on repeated removal and reseating of the valve assembly in an internal combustion engine. The plug 34 also absorbs such shocks as may be encountered in the operation of an automobile.

The thermostat valve assembly of Figs. 4 and 5 is generally similar to that of Figs. 1-3 and includes a centrally apertured disk 50 having a peripheral bead 52 and an upstanding vertical flange 54 around its central aperture inturned to form a valve seat 56. A U-shaped thermostat supporting strap having legs 58 and 60 depends from the disk 50, the upper ends of the legs 58 and 60 being staked to the disk 50 as indicated, respectively, at 62 and 64. A thermostat includes a rod 66 carrying a valve 68 at its upper end cooperating with the valve seat 56 and is guided in its reciprocation by a sleeve 70 formed by an upturned flange around a central aperture in a cross web 72 extending across the central aperture of the disk 50. Further, the valve is biased to closed position by a spring 74 having its upper end seated in an annular groove on the underside of the valve seat 56 and its lower end seated in an outwardly and upwardly extending flange formed at the rim of a member 76 of inverted cup-shaped attached to the rod 66. Up to this point, the construction of the valve assembly of Figs. 4 and 5 is identical in structure and function with the valve assembly of Figs. 1-3.

The valve assembly of Figs. 4 and 5 differs from that of Figs. 1-3 in the following features. The U-shaped thermostat strap has an imperforate cross piece 78 forming the bottom of a closed rigid chamber for holding a thermally expanding medium. A dome-shaped wall 80 completes this chamber. At its center, the dome 80 is apertured and formed with a depending tubular flange 82 fixedly receiving a cylinder 84 in which the rod 66 reciprocates. A plug 86 of rubber or other resilient material is disposed immediately below the lower end of the rod 66 and seals the cylinder 84 against escape of thermally expanding medium along the rod 66.

The cylinder 84 projects above and below the flange 82. Specifically, the distance from the lower end of the cylinder 84 to the cross piece 78 is a fraction of the length of the sealing plug 86.

In the operation of the valve assembly of Figs. 4 and 5, a vacuum is pulled in the chamber 78, 80 whenever the temperature of the ambient medium is below that required to open the valve, the downward movement of the rod 66 being limited by the impingement of the plug 86 against the cross piece 78. The plug 86 also acts to absorb such shocks as may be encountered in the operation of an automobile.

In the valve assembly of Figs. 4 and 5, the dome-shaped wall 80 provides a relatively large area of contact with the ambient medium, whereby the thermal lag in heat transfer is minimized.

Apart from the features indicated, the valve assembly of Figs. 4 and 5 functions similarly to that of Figs. 1-3.

The valve assemblies of Figs. 1-5 are in the nature of "upward" poppet valves, i.e. the valves open in the direction of normal flow of ambient medium such as water, which flows upwardly through these valve assemblies. The principles of the present invention are also applicable to "downward" poppet valves, i.e. valves which open in a direction opposite to the normal flow of ambient medium therethrough, as illustrated by the valve assembly of Figs. 6 and 7, which is described as follows.

Referring now to Figs. 6 and 7, the valve assembly there shown includes a centrally apertured disk 90 having a peripheral upwardly extending annular bead 92 adapted for attachment to a radiator conduit. Around the central aperture of the disk 90, the latter is formed into an upwardly deflected flange 94 which has its rim bent arcuately downwardly to define, on its lower surface, an annular valve seat 96. The central aperture of the disk 90 is spanned by an upwardly arcuate cross web 98 which has affixed to its center the upper end of a rod 100 forming part of a thermostat described hereinbelow.

A generally U-shaped thermostat guiding strap includes vertical legs 102 and 104 having their upper ends staked to the disk 90 opposite portions thereof between the bead 92 and the flange 94, as indicated, respectively, at 106 and 108. This strap further includes a cross piece 110 centrally offset upwardly, as indicated at 112. This offset portion is centrally apertured as shown at 114, and receives, with a slidable fit, a rigid container 116 for a thermally expansive medium forming part of a thermostat also including said rod 100. Specifically, the container 116 is closed by a rigid cover 118 affixed thereto. This cover is apertured at its middle, and is also formed around this aperture with an upstanding flange 120 having its inner edge turned centrally to form a container of inverted cup-shaped receiving a sealing plug 122 of rubber or other resilient material. The upstanding flange 120 is crimped, as shown, to hold the sealing plug 122 in position. The centrally turned rim of the flange 120 has its edge spaced from the rod 100, to receive and hold a tubular cylinder 124 in which the rod 100 reciprocates. The bottom edge of the cylinder 124 rests on the plug 122 which is formed with a central bore 126 aligned with the tubular cylinder 124 and having the same internal diameter as the cylinder 124, the rod 100 extending through this bore 126 and projecting into the container 116. If desired, the lower end of the rod 100 may be pointed.

The upper end of the cylinder 124 is threaded externally, to receive an internally threaded hub 128 of a dished valve 130 cooperating with the valve seat 96. A tapering coil spring 132 has its upper end seated against the bottom of the valve 130 and the hub 128 and its lower end seated against the cross piece 110 of the thermostat guide strap around its upwardly offset central bottom portion 112. The spring 132 biases the valve 130 to closed position, i.e. upwardly.

The valve assembly of Figs. 6 and 7 functions as follows. The rod 100 does not move, having its upper end fixed to the cross web 98. The container 116 is slidable with respect to the aperture 114 of the cross piece 110. Therefore, when the temperature of the ambient medium rises, and the medium within the rigid container 116, 118 expands, the container 116, 118, the cylinder 124 and the valve 130 move downwardly as a unit under the influence of force of expanding medium in the container 116, 118, whereby the valve is opened. When the temperature of the medium in the container 116, 118 drops, the force of the spring 132 pulls the thermostat assembly 116, 118, 124 and the valve 130 upwardly, to close the valve.

The plug 122 acts not only as a seal to prevent leakage of thermally expanding medium from the thermostat chamber 116, 118 but also to resist frictionally any sudden movement of the rod 100, as otherwise could happen on such shocks as are encountered when an automobile is operated.

It will be noted that in the valve assembly of Figs. 6 and 7, as in the valve assemblies of Figs. 1-5, the thermostat actuates the valve directly, and this action is not affected by variation in the static or dynamic pressure of the ambient medium. This feature distinguishes the valve assemblies of the present invention from other thermostat valve assemblies, for instance, those wherein the thermostat includes a bellows device containing a thermally expansive medium. Devices of the latter type are affected, in their operation, by pressure variation in the ambient medium.

Many details may be varied without departing from the principles of the present invention, and it is therefore not my intention to limit the scope of the patent granted on this invention otherwise than necessitated by the scope of the appended claim.

The invention is claimed as follows:

A thermostat valve assembly suitable for use in internal combustion engines, and comprising a mounting member including a centrally disposed guide aperture and providing a valve opening and a valve seat therearound, a support member including a pair of strap portions depending from said mounting member and an imperforate cross member connecting the lower ends of said strap members, a dome-shaped wall section having the peripherally larger lower end thereof secured to said cross member and closed thereby to provide a chamber receiving thermally expansive medium, the peripherally smaller upper end of said dome-shaped wall section including a depending integral flange portion disposed internally thereof and defining an aperture therethrough, an elongated guide tube secured within said depending flange portion with the upper end of the tube projecting above the dome-shaped wall section and with the lower end of the tube positioned in close proximity to said cross member, a valve stem extending through said guide aperture and slidably mounted in said elongated guide tube and guided thereby over a substantial portion of its length for stable rectilinear movement, a resilient sealing plug slidable within said elongated tube and disposed below the lower end of said stem and of a length greater than the spacing of the lower end of the tube from said cross member to prevent the plug from escaping from said guide tube at the lower extremity of movement of said stem, a valve member carried by the upper end of said stem in position for cooperation with said valve seat, a frusto-conical spring support having the reduced end thereof secured to said valve stem substantially intermediate said guide aperture and the upper end of said tube at a predetermined open position of said valve member and with the depending flaring wall thereof having a spring seat at the lower end thereof, the flaring wall of said spring support being spaced from the adjacent surface of the dome-shaped wall section at said predetermined open position of said valve member such as to prevent interference therebetween to full movement of said valve member toward closed position, and a coil spring seated in said spring seat with the opposite end seated beneath the valve seat for urging the valve member and valve stem toward closed position.

References Cited in the file of this patent

UNITED STATES PATENTS

| | | |
|---|---|---|
| 1,663,566 | Royer | Mar. 27, 1928 |
| 1,844,488 | Ward | Feb. 9, 1932 |
| 2,469,930 | Payne | May 10, 1949 |
| 2,598,351 | Carter | May 27, 1952 |
| 2,634,057 | Hoffman | Apr. 7, 1953 |
| 2,636,776 | Vernet | Apr. 28, 1953 |
| 2,765,983 | Mayo | Oct. 9, 1956 |
| 2,777,638 | Wood | Jan. 15, 1957 |
| 2,781,784 | Baker | Feb. 19, 1957 |

FOREIGN PATENTS

| | | |
|---|---|---|
| 722,288 | France | Nov. 22, 1930 |
| 436,836 | Great Britain | Oct. 18, 1935 |